(12) United States Patent
Carey et al.

(10) Patent No.: US 6,607,610 B1
(45) Date of Patent: Aug. 19, 2003

(54) POLYPHENOLAMINE COMPOSITION AND METHOD OF USE

(75) Inventors: William S. Carey, Wallingford, PA (US); Bruce Haberle, Fogelsville, PA (US); Jeffrey I. Melzer, Lansdale, PA (US); Edward A. Rodzewich, Fourtown, PA (US); Ping Lue, Boothwyn, PA (US); Andrew Solov, Holland, PA (US)

(73) Assignee: GE Betz, Inc., Trevose, PA (US)

( * ) Notice: Subject to any disclaimer, the term of this patent is extended or adjusted under 35 U.S.C. 154(b) by 0 days.

(21) Appl. No.: 10/273,446

(22) Filed: Oct. 18, 2002

(51) Int. Cl.$^7$ ................................................ C23C 22/05
(52) U.S. Cl. ................ 148/247; 106/14.12; 106/14.15; 106/14.44
(58) Field of Search .......................... 106/14.44, 14.12, 106/14.15; 148/247

(56) References Cited

U.S. PATENT DOCUMENTS

| | | |
|---|---|---|
| 4,433,015 A | 2/1984 | Lindert |
| 4,457,790 A | 7/1984 | Lindert et al. |
| 4,466,840 A | 8/1984 | Frank et al. |
| 4,666,840 A | 5/1987 | Olivieri et al. |
| 4,714,752 A | 12/1987 | Sokalski |
| 4,770,727 A | 9/1988 | Siegl et al. |
| 4,790,878 A | 12/1988 | Siegl et al. |
| 4,792,355 A | 12/1988 | Siegl et al. |
| 4,795,505 A | 1/1989 | Siegl et al. |
| 4,795,506 A | 1/1989 | Sokalski |
| 4,830,680 A | 5/1989 | Siegl et al. |
| 4,840,667 A | 6/1989 | Siegl et al. |
| 4,917,729 A | 4/1990 | Siegl et al. |
| 4,959,103 A | 9/1990 | Siegl et al. |
| 5,298,289 A | 3/1994 | Lindert et al. |
| 5,324,347 A | 6/1994 | Lawson |
| 5,662,746 A | 9/1997 | Affinito |
| 5,972,433 A | 10/1999 | Chen et al. |

*Primary Examiner*—Anthony J. Green
(74) *Attorney, Agent, or Firm*—Duane Morris LLP

(57) ABSTRACT

The present invention relates to a composition for the treatment of metal substrates including an aqueous solution of a Group IVA metal ion, selected from the group consisting of zirconium, titanium, hafnium and mixtures thereof, and a water-soluble or water-dispersible polyphenolamine.

14 Claims, No Drawings

POLYPHENOLAMINE COMPOSITION AND METHOD OF USE

FIELD OF THE INVENTION

The present invention relates to a composition and its use in forming corrosion inhibiting and adhesion promoting coatings on metal surfaces. More particularly, the present invention relates to water-soluble or water-dispersible polyphenolamine compositions and their use as metal treatment compounds.

BACKGROUND OF THE INVENTION

One means of minimizing the impact of corrosion on metal surfaces has been to coat the surface with paint. The paint acts as a barrier between the metal surface and the environment and thus helps prevent or at least minimize corrosion of the metal surface. However, one problem associated with this solution is that the paint does not always adhere properly to the metal surface. The result may be peeling, cracking, blistering, or flaking of the paint, thus rendering the substrate metal surface again subject to corrosion.

The need for applying protective coatings to metal surfaces for improved corrosion resistance and paint adhesion is well known in the metal finishing and other metal arts. One attempt to alleviate the problem for adhesion of paint to metal surfaces has been to subject the metal surface to a treatment which is known as phosphating, i.e., a process whereby a metal surface is treated with chemicals which form a metal phosphate conversion coating on the metal surface. Such a treatment typically assists in rendering the metal less subject to corrosive attack and, at the same time, in rendering the surface more suitable for application of a protective coating such as paint. The resulting bond between the metal surface and the paint is thus greatly improved. However, phosphate baths require that precise formulations be maintained and that the process procedures and conditions of operation be controlled within narrow limits. The phosphating process also requires that the metal surface be given two rinses subsequent to the phosphating bath, the first being a water rinse and the second being a passivating solution rinse which further enhances the corrosion resistance and adhesion characteristics of the coating. Traditionally, conversion coated metal surfaces have been given a second rinse with a solution containing a hexavalent chromium compound.

Lindert, U.S. Pat. No. 4,433,015 teaches that because of the toxic nature of hexavalent chromium compounds, expensive treatment equipment must be used to remove chromates from effluent water to prevent pollution of rivers, streams and drinking water sources. Hence, in recent years there have been research and development efforts directed to discovering effective alternatives to the use of such post-treatment solutions. Lindert teaches that an alternative to the hexavalent chromium compound is a polymer having phenol groups attached along an ethylenic polymer backbone. The phenol groups may have an amine substituent, which may further comprise hydroxy-alkyl groups. The polymer, made water-soluble through neutralization of the amine moiety with organic acid, may be employed in an acidic or basic solution. It is also taught by Lindert that the solution, in addition to being used as a post-phosphate rinse, may be used to treat previously untreated metal surfaces including aluminum and zinc.

Frank et al., U.S. Pat. No. 4,466,840 teaches that there is a need for a simple means to achieve results similar to that obtained with a phosphatizing process without the complexity of such a treatment. As an alternative to such a phosphatizing treatment, Frank et al., proposes employing hydroxybenzylamines, preferably in an aqueous solution, to produce coatings on metal surfaces, which coatings act as corrosion inhibitors and adhesion promoters. The amine moiety of the hydroxybenzylamines comprise secondary amines having alkyl substituents.

Siegl et al., U.S. Pat. Nos. 4,790,878 and 4,830,680 teaches the use of unique diphenolamines in an aqueous acidic solution useful to deposit an adhesion promoting and corrosion inhibiting coating on metal surfaces.

Siegl et al., U.S. Pat. Nos. 4,770,727 and 4,840,667 further teach the use of unique diphenolamine oligomeric metal-chelating compounds useful to deposit an adhesion promoting and corrosion inhibiting coating on metal surfaces. These compositions, in which the mole ratio of amine reagent to phenol reagent is 1:2, are compositionally different than the compositions of the present invention.

SUMMARY OF THE INVENTION

The present invention is directed to new polyphenolamine compounds and their use as corrosion inhibiting and adhesion promoting treatments for metal surfaces. The polyphenolamine compounds of the present invention are prepared via any suitable route, preferably via the Mannich reaction of a phenol, an aldehyde and a mixture of amines. The polyphenolamine compounds of the present invention are water-soluble or water dispersible compounds. The most preferred compound is prepared via the Mannich reaction of p-cresol, formaldehyde and a mixture of ethanolamine and polyetheramine. The polyphenolamine compounds of the present invention have been found to be particularly effective at depositing an adhesion promoting and corrosion inhibiting coating on a metal surface.

DETAILED DESCRIPTION OF THE PREFERRED EMBODIMENTS

The present invention is directed to new polyphenolamine compounds and their use in treating metal surfaces to enhance the corrosion resistance and adhesion properties thereof. The compound comprises a water-soluble or water-dispersible compound selected from compounds having the general chemical formula:

A—L—POH—[—L—A—L—POH—]$_x$—L—A      Formula 1 wherein segments "A" (amine), "L" (aldehyde), and "POH" (phenolic compound) are formed by reaction of the amine, aldehyde, and phenolic compound, for a time and under conditions sufficient to form a polyphenolamine of Formula 1. This synthesis technique is known to those skilled in the art as being exemplary of the Mannich reaction.

The segment "A" in Formula 1 is the unit formed after reaction of one or more amines. Exemplary amines encompassed by "A" include, but are not limited to, substituted or non-substituted $C_1$–$C_{18}$ alkyl or aryl primary and secondary amines, such as ethanolamine, benzylamine, laurylamine, 2-(methylamino)ethanol, allylamine, and (aminomethyl) phosphonic acid; aminoacids, such as glycine, alanine, glucosamine, and iminodiacetic acid; polyetheramines, such as the Jeffamine® series of products commercially available from Huntsman Corporation; mixtures of any of the foregoing and the like; with the proviso that "A" is not encompassed entirely of secondary amines.

The segment "L" in Formula 1 is the unit formed after reaction of one or more aldehydes. Exemplary aldehydes encompassed by "L" include, but are not limited to, formaldehyde, benzaldehyde, mixtures of any of the foregoing and the like. The formaldehyde utilized in the reaction may be either an aqueous solution optionally stabilized with methanol, an alcoholic solution, or paraformaldehyde.

The segment "POH" in Formula 1 is the unit formed after reaction of one or more phenolic compounds. Exemplary phenolics encompassed by "POH" include, but are not limited to, phenolic compounds that possess at least two reactive sites, such as cresol, nonylphenol, catechol, resorcinol, mixtures of any of the foregoing and the like. As would be understood by one skilled in the art in view of the present disclosure, it is intended that such phenolic compounds contain at least two sites that would be susceptible to the Mannich reaction.

The molar ratio of A:L:POH may fall within the range of 1:1:1 to 1.5:2:1. In this regard, the molar percentage of "A", "L", and "POH" must add up to 100%.

In a preferred embodiment of the invention the polyphenolamine compound for treating metal surfaces to enhance the corrosion resistance and adhesion properties thereof is represented by the following formula:

Formula 2

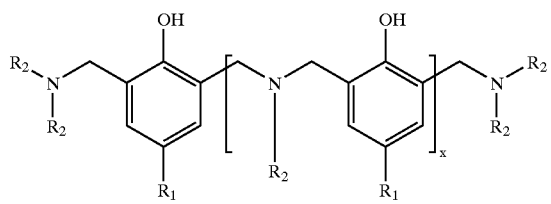

wherein $R_1$ is a substituted or unsubstituted $C_1$–$C_{18}$ alkyl or aryl, $CO_2M$, $SO_3M$, or mixtures thereof; M is hydrogen, a water-soluble cation, or mixtures thereof; x is 1–100; $R_2$ is hydrogen, a substituted or unsubstituted alkyl, aryl, hydroxyalkyl, —[—CH($R_3$)—$CH_2$—O—]$_n$—$R_3$, or mixtures thereof; $R_3$ is hydrogen or a $C_1$–$C_{18}$ alkyl radical; and n is 1–100.

In a particularly preferred embodiment of the invention the polyphenolamine compound is prepared by reacting a mixture of ethanolamine and Jeffamine® XTJ-506 with formaldehyde and p-cresol, then isolating the composition as an aqueous salt solution, to yield a composition represented by the following formula:

Formula 3

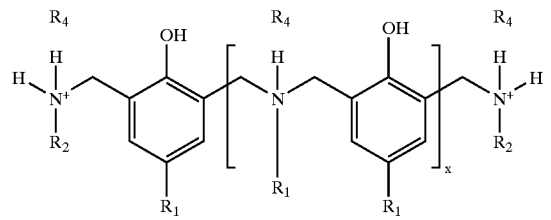

wherein x is 1 to 25, $R_1$ is —$CH_3$, $R_2$ is a mixture of —$CH_2$—$CH_2$—OH and —[—CH($R_3$)—$CH_2$—O—]$_n$—$CH_3$, n is approximately 22, $R_3$ is approximately a 19:3 molar ratio of hydrogen to $C_1$ alkyl, and $R_4$ is a water-soluble anion. The molar percentage of ethanolamine to Jeffamine® XTJ-506 can range from about 50:50 to about 99:1, preferably from about 90:10 to about 75:25.

Exemplary water-soluble anions encompassed by $R_4$ include, but are not limited to, chloride, carboxylate, sulfate, phosphate, nitrate, fluozirconate, fluotitanate, fluosilicate, mixtures of any of the foregoing and the like. Preferably $R_4$ is a phosphate anion. As would be understood by one skilled in the art in view of the present disclosure, neutralization of the compound of Formula 2 with exemplary acids such as hydrochloric, oxalic, acetic, sulfuric, phosphoric, phosphorous, nitric, hexafluozirconic, hexafluotitanic, hexafluosilicic, and the like yields the compound of Formula 3.

The compounds of the present invention can be prepared via a multi-step process involving the generation of an intermediate or single step process. As an example of a multi-step synthesis a secondary amine is reacted with a molar equivalent of aldehyde and phenolic compound in a 1:1:1 molar ratio under conditions known to those skilled in the art to yield predominantly a mono-substituted phenolic Mannich adduct. The Mannich adduct is then further reacted with a primary amine and aldehyde in a 1:1:2 molar ratio, respectively, to yield a polyphenolamine composition. During this second step rearrangement reactions are possible that result in the formation of polyphenolamine species higher in molecular weight than would be anticipated based solely on the reactant stoichiometry. In a single step process there is no secondary addition of an amine, aldehyde, or phenolic reactant.

The compounds of the present invention can be utilized as produced or purified by methods known to those skilled in the art. For example, the products can be subjected to distillation, precipitation, liquid extraction, solid extraction (e.g., activated carbon), or like techniques to minimize the presence of undesirable residual reactants.

It is also an aspect of this invention that the polyphenolamine compounds can be prepared in such a manner that the resulting residual phenol and aldehyde levels are extremely low. For example, conducting the Mannich reaction first under basic conditions at 75–100° C. under atmospheric conditions, pH adjusting acidic, further reacting at 75–100° C. under atmospheric conditions, and optionally concentrating, yields a concentrated product (25–100 wt. % as the free base amine) in which the residual phenolic and formaldehyde reagents are in the parts per million (ppm) range as product.

The composition of the present invention is particularly effective as a post-treatment for a metal substrate. The term "post-treatment" refers to the treatment of a metal substrate which has undergone conversion coating. Treatment of a metal substrate having a bare metal surface is also within the scope of the present invention. Typical metal substrates include, but are not limited to zinc and its alloys, aluminum and its alloys, iron, tin, copper and its alloys, and cold-rolled, ground, pickled, hot-rolled and galvanized steel. When employed as a metal surface post treatment, the composition of the present invention is preferably supplied as an aqueous solution. The composition of the present invention may be water-soluble or water dispersible. To provide the desired water solubility or water dispersability, an organic acid or inorganic acid can be used for protonization or quaternization. Organic or inorganic acids may be employed to provide acidic character (pH) to the composition and assist in solublizing or dispersing the treatment composition. Many such acids are known in the art. Preferably, acids employed are acids of strongly coordinating anions such as fluoroacids including hexafluorozirconic, hexafluorotitanic and hexafluorosilicic acids, phosphoric acid, sulfuric acid, hydrochloric acid, oxalic acid and acetic acid. Mixtures of compatible acids may also be employed to provide the desired pH to the aqueous composition. Bases, such as NaOH, KOH, and NH$_4$OH may be employed to provide basic character to the composition and assist in solubilizing the treatment compound should such be necessary. Other bases which may be suitable will be apparent to those skilled in the art in view of the present disclosure. Mixtures of compatible bases may also be employed.

The pH of the aqueous metal post treatment solution can vary from about 2.0 to 10.5. The preferred pH is from about 4.5 to 5.5 for the aqueous metal treatment solution. The aqueous metal treatment solution of the present invention will be used in a working bath at a dilute concentration from that of the composition as produced by the Mannich reaction or that of the composition during storage and/or transportation. A concentrate solution of the composition may comprise up to about 25% by weight based on active ingredients of the treatment composition. From a commercial point of view, a suitable concentrate of the present invention may comprise from about 1 weight % to about 10 weight % of the treatment composition.

Optional materials, which may be included in the post treatment solution of the composition of the present invention, include those materials commonly employed in corrosion inhibiting and adhesion promoting compositions. Exemplary of such materials are dispersing agents, foam control agents, pigments, adhesion promoters and solubilizers such as polyacrylic acid, polyamines, and polyphenols and compatible corrosion inhibitors. As in a typical metal treatment operation, the metal to be treated with the aqueous composition of the present invention is preferably initially cleaned by a chemical or a physical process and water rinsed to remove grease and dirt from the surface. The metal surface is then conversion coated, rinsed and brought into contact with the post treatment solution of the present invention. The present invention is useful to coat a broad range of metal surfaces, including zinc and its alloys, aluminum and its alloys, iron, tin, copper and its alloys, and cold-rolled, ground, pickled, hot-rolled and galvanized steel surfaces. The metal surface may be in any physical form, such as sheets, tubes or rolls.

The corrosion inhibiting adhesion promoting composition of the present invention may be applied to metal surfaces in any convenient manner. Thus, it may be sprayed, painted, dipped, or otherwise applied to the metal surface. The temperature of the applied solution can vary over a wide range, from the solidification temperature of the solution or dispersion to the boiling point of the solution or dispersion. During application to the metal surface, the temperature of the composition of the present invention is preferably between 20° C. and 80° C., more preferably between about 20° C. and 55° C. It is generally believed that a substantially uniform layer of the corrosion inhibitor/adhesion promoter coating should be deposited on a metal surface. It is also believed that something approaching a molecular layer is sufficient to achieve the desired results. Useful contact time can range from about 0.25 to about 5 minutes with contact times between 0.25 and 1 minute being sufficient at about room temperature. As will be apparent to those skilled in the art in view of the present disclosure, the treatment time and temperature of the applied composition may vary from those described. Selection of optimal composition and method parameters, such as concentrations of the polyphenolamine composition in the treatment bath, pH, optional materials, contact time, and bath temperature during coating would be dependent, in part, on the particular substrate, processing conditions and final coating desire. As such, selection of such parameters will be within the skill of those in the art, in view of the present disclosure.

After application of the treatment solution to the metal surface, the surface is preferably rinsed. Such rinsing is optional for a non-phosphated metal surface, although, in either case, good results can be obtained without rinsing after application of the treatment. Next, the treated metal surface is dried. Drying can be carried out by, for example, circulating air or oven drying. While room temperature drying can be employed, it is preferable to use elevated temperatures to decrease the amount of drying time required. After drying, the treated metal surface is ready for painting or the like. The surface is suitable for standard paint or other coating application techniques such as brush painting, spray painting, electrostatic coating, dipping, roll coating as well as electro-coating as a result of the treatment of the present invention. Application of the treatment compound of the present invention to a metal surface improves paint adhesion and corrosion resistance characteristics.

The present invention will now be further described with reference to a number of specific Examples which are to be regarded as illustrative and not as restricting the scope of the present invention.

EXAMPLE 1

To a suitable reaction vessel equipped with a stirrer, thermometer, addition port, nitrogen sparge, and combination reflux condenser/distillation apparatus was charged 25.82g DI water. The reactor contents were heated to 40° C. under a nitrogen atmosphere, then ethanolamine (99 wt. %, 30.56 g, 0.495 mole) and p-cresol (98 wt. %, 54.66 g, 0.495 mole) were charged. Next aqueous formaldehyde solution (37 wt. %, 80.41 g, 0.990 mole) was charged dropwise over a 1-hour period. The batch temperature was allowed to exotherm to 60° C. during the addition, after which it was maintained at 60° C. for 2 hours. The batch was then concentrated in-vacuo at 40–60° C. The product was then adjusted to ~50 wt. % actives with Propasol-P® (Union Carbide) solvent.

The polymer may be subsequently diluted with water and fluorozirconic acid. The processing bath may be prepared as, e.g., a 1% dilution of product. In a preferred embodiment, components of product and bath are as follows:

|  | Product (wt. %) |
| --- | --- |
| Polymer (50% active) | 6.00 |
| 45% H$_2$ZrF$_6$ | 0.89 |
| Deionized water | 93.11 |
|  | Bath |
| Polymer (100% active) | 300 ppm |
| 100% H$_2$ZrF$_6$ | 40 ppm |
| Water | qs/liter |

Note that the pH of the bath above may preferably be adjusted to about 5.0 by adding a small amount of alkalinity in the form of ammonium hydroxide, soda ash, caustic soda or caustic potash. An effective amount of a suitable defoaming agent may also be added.

EXAMPLES 2–7

Examples 2–7 were prepared as described in Example 1 except no water was charged up-front, the reactions were held at 75° C. for 4 hours after addition of the formaldehyde, and a mixture of amines (on a same total molar basis of the ethanolamine charge of Example 1) were utilized in the preparation. These examples are summarized in Table 1. Example 4 was further analyzed and found to contain 0.4 wt. % residual p-cresol and 1.5 wt. % residual formaldehyde as product.

TABLE 1

| Example | Amine Component | wt. % Actives | wt. % Propasol-P | Viscosity (cps) |
|---|---|---|---|---|
| 1 | 100.0% Ethanolamine | 43.12 | 50.00 | 19.2 |
| 2 | 99.0% Ethanolamine 1.0% XTJ-506 | 49.99 | 48.37 | 25.0 |
| 3 | 87.5% Ethanolamine 12.5% XTJ-506 | 50.24 | 49.43 | 18.6 |
| 4 | 75.0% Ethanolamine 25.0% XTJ-506 | 50.05 | 49.58 | 16.5 |
| 5 | 50.0% Ethanolamine 50.0% XTJ-506 | 49.99 | 49.70 | 18.5 |
| 6 | 100.0% XTJ-506 | 48.38 | 50.13 | 13.0 |
| 7 | 100.0% D-230 | 43.87 | 55.16 | 78.0 |

In Table 1, XTJ-506 and D-230 are designations of polyetheramines representative of the Jeffamine® series of products available from Huntsman Corporation. The general structures of these amines provided in Huntsman Corporation product literature are as follows:

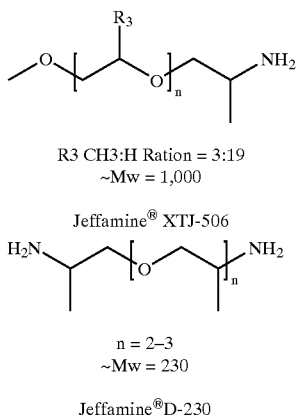

R3 CH3:H Ration = 3:19
~Mw = 1,000

Jeffamine® XTJ-506 n = 2–3
~Mw = 230

Jeffamine®D-230

EXAMPLES 8–13

Examples 8–13 were prepared as described in Example 1 except no water was charged up-front and the amine charge was fixed at a 87.5:12.5 mole ratio of ethanolamine to Jeffamine® XTJ-506, respectively. In addition, the hold after the formaldehyde addition was adjusted to 4 hours at 75° C. and portions of the p-cresol charge was substituted on a molar basis with different phenolic compounds. These examples are summarized in Table 2.

TABLE 2

| Example | Phenol Component | wt. % Actives | wt. % Propasol-P | Viscosity (cps) |
|---|---|---|---|---|
| 8 | 97.5% p-Cresol 2.5% Catechol | 50.9 | 48.6 | 23.3 |
| 9 | 95.0% p-Cresol 5.0% Catechol | 50.8 | 48.9 | 22.8 |
| 10 | 92.5% p-Cresol 7.5% Catechol | 50.9 | 48.7 | 25.5 |
| 11 | 85.0% p-Cresol 15.0% Catechol | 51.3 | 48.7 | 34.7 |

TABLE 2-continued

| Example | Phenol Component | wt. % Actives | wt. % Propasol-P | Viscosity (cps) |
|---|---|---|---|---|
| 12 | 75.0% p-Cresol 25.0% Nonylphenol | 51.3 | 48.7 | 20.5 |
| 13 | 70.0% p-Cresol 20.0% Nonylphenol 10.0% Catechol | 51.3 | 48.7 | 29.9 |

Note that mole ratios of from about 50:50 to 99:1 ethanolamine to polyetheramine will also be effective for purposes of the present invention.

EXAMPLE 14

Example 14 was prepared as Example 3 except a molar equivalent of aqueous phosporic acid (85 wt. %) was charged to the amine mixture prior to charging the p-cresol. The hold after the formaldehyde addition was also adjusted to 4 hours at 75° C. and the concentrated crude product was diluted to 50.0 wt. % actives as free base amine with DI water and isolated as an aqueous solution. The sample was analyzed and found to have a viscosity of 59.6 cps, a pH of 4.09, and residual reactant levels of 0.2 wt. % formaldehyde and 4.5 wt. % p-cresol. The phosphate content of the isolated product was calculated to be 16.7 wt. % as $H_3PO_4$.

EXAMPLE 15

Example 15 was prepared as Example 3 except the mole ratio of p-cresol to formaldehyde to total amine was 1:2:1.5, respectively. The batch was held for 4 hours at 96° C. after addition of the formaldehyde solution. A molar equivalent of aqueous phosphoric acid (85 wt. %) relative to the amine content was then charged to the reactor and the batch was held an additional 4 hours at 96° C. Then, after concentration in vacuo, the crude product was diluted to 50.0 wt. % actives as the free base amine with DI water and isolated as an aqueous solution. The sample was analyzed and found to have a viscosity of 538 cps, a pH of 3.5, and residual reactant levels of 1,300 ppm formaldehyde and 47 ppm p-cresol. The phosphate content of the isolated product was calculated to be 20.6 wt. % as $H_3PO_4$.

In a repeat of Example 15 the residual formaldehyde and p-cresol content was analyzed at 4 hours after the formaldehyde feed, 4 hours after addition of the phosphoric acid, and for the final product. The residual formaldehyde levels were 3,700 ppm, 1,500 ppm and 1,200 ppm, respectively. The residual p-cresol levels were 80 ppm, 50 ppm, and 50 ppm, respectively.

EXAMPLE 16

The treatment composition of the present invention in combination with hexafluozirconic acid, were made down in deionized water at 120° F. and adjusted to pH 5.0 with ammonium hydroxide, unless noted otherwise. The formulated treatment composition was then spray applied to a cold rolled steel test panel that was treated with a commercial phosphate conversion coating treatment (Permatreat® 375B or 308B available from GE Betz, Inc.). The treated test panel was then rinsed with deionized water, passed through a dryoff oven, and painted with a commercially available paint. Each test was conducted in duplicate and the Neutral Salt Spray corrosion performance, Conical Mandrel adhesion performance, and Reverse Impact adhesion performance were conducted in accordance with ASTM B117-97, ASTM D522-93A, and ASTM D2794-93, respecetively. The results of the performance testing, as shown in Table 3, were recorded as either a set of values for the duplicate tests or as an average of the duplicate test.

In addition to the treatment composition of the present invention, two commercially available corrosion inhibition/ adhesion promoting treatments were also tested (PhosGard 800HP available from GE Betz, Inc. and Parcolene 95 AT available from Henkel Corporation). The commercial treatments were applied to the test panels in the manner described above. Table 4 summarizes the results of the testing of Example 15 in combination with hexafluozirconic acid in various paints under varying treatment temperatures.

TABLE 3

| | Physical Performance (pick off rating) | | Corrosion Performance | | | |
|---|---|---|---|---|---|---|
| | Conical Mandrel | Reverse Impact | (scribe creepage) Neutral Salt Spray Hours | | | |
| | (mm) | (In/lb) | 72 | 96 | 168 | 240 |
| Permatreat 375B | | | | | | |
| #028 Universal Gray, Lilly[1] | | | | | | |
| 300 ppm Example 1 + 40 ppm $H_2ZrF_6$ | 0 | 150 | 8 | 8 | 8 | 6 |
| PhosGard 800 HP, 90 F., rinsed | 0 | 120 | 9 | 8 | 7 | 6 |
| Parcolene 95 AT, 120 F. | 0 | 150 | 9 | 9 | 8 | 7 |
| Icron Polyester Gray[2] | | | | | | |
| 300 ppm Example 1 + 40 ppm $H_2ZrF_6$ | 0 | 160 | 8 | 7 | 7 | 6 |
| PhosGard 800 HP, 90 F., rinsed | 0 | 110 | 8 | 7 | 7 | 6 |
| Parcolene 95 AT, 120 F. | 0 | 130 | 8 | 8 | 7 | 6 |
| Polycron 111[3] | | | | | | |
| 300 ppm Example 1 + 40 ppm $H_2ZrF_6$ | 0 | 130 | 9 | 8 | 7 | 6 |
| PhosGard 800 HP, 90 F., rinsed | 0 | 60 | 9 | 8 | 7 | 6 |
| Parcolene 95 AT, 120 F. | 0 | 100 | 9 | 8 | 7 | 7 |
| Permatreat 308B | | | | | | |
| #028 University Gray Lilly[1] | | | | | | |
| 300 ppm Example 1 + 40 ppm $H_2ZrF_6$ | 0 | 120 | 7 | — | 6 | 5 |
| PhosGard 800 HP, 90 F., rinsed | 0 | 120 | 5 | — | 5 | 4 |
| Parcolene 95 AT, 120 F. | 0 | 120 | 6 | — | 5 | 5 |
| Icron Polyester Gray[2] | | | | | | |
| 300 ppm Example 1 + 40 ppm $H_2ZrF_6$ | 0 | 90 | 8 | — | 7 | 6 |
| PhosGard 800 HP, 90 F., rinsed | 0 | 30 | 6 | — | 5 | 5 |
| Parcolene 95 AT, 120 F. | 0 | 30 | 7 | — | 6 | 6 |
| Polycron 111[3] | | | | | | |
| 300 ppm Example 1 + 40 ppm $H_2ZrF_6$ | 0 | 80 | 9 | — | 7 | 6 |
| PhosGard 800 HP, 90 F., rinsed | 0 | 100 | 8 | — | 6 | 5 |
| Parcolene 95 AT, 120 F. | 0 | 80 | 8 | — | 7 | 6 |

[1]Lilly #028 Universal gray enamel
[2]Icron (Q4000 series) — a solvent based polyester baking enamel
[3]Polycron 111 — a polyester melamine

TABLE 4

| | | | | | | PHYSICAL PERFORMANCE (pick off rating) | | CORROSION PERFORMANCE | | | |
|---|---|---|---|---|---|---|---|---|---|---|---|
| | | H2ZrF6 | | PO4 | | Conical Mandrel | Reverse Impact | (scribe creepage rating) Neutral Salt Spray Hours | | | |
| Example | ppm | (ppm) | Temp. | Treat. | Paint | (mm) | ("#) | 72 | 96 | 168 | 240 |
| 15 | 300 | 40 | | 375B | Lilly UG | 0 | 150 | 8 | 8 | 8 | 6 |
| PG 800 HP | | | 90° F. | 375B | Lilly UG | 0 | 120 | 9 | 8 | 7 | 6 |
| 95 AT | | | 120° F. | 375B | Lilly UG | 0 | 150 | 9 | 9 | 8 | 7 |
| 15 | 300 | 40 | | 375B | Icron PG | 0 | 160 | 8 | 7 | 7 | 6 |
| PG 800 HP | | | 90° F. | 375B | Icron PG | 0 | 110 | 8 | 7 | 7 | 6 |
| 95 AT | | | 120° F. | 375B | Icron PG | 0 | 130 | 8 | 8 | 7 | 6 |
| 15 | 300 | 40 | | 375B | Polycron 111 | 0 | 130 | 9 | 8 | 7 | 6 |
| PG 800 HP | | | 90° F. | 375B | Polycron 111 | 0 | 60 | 9 | 8 | 7 | 6 |

TABLE 4-continued

| Example | H2ZrF6 ppm | PO4 (ppm) | Temp. | Treat. | Paint | PHYSICAL PERFORMANCE (pick off rating) | | CORROSION PERFORMANCE (scribe creepage rating) Neutral Salt Spray Hours | | | |
|---|---|---|---|---|---|---|---|---|---|---|---|
| | | | | | | Conical Mandrel (mm) | Reverse Impact ("#) | 72 | 96 | 168 | 240 |
| 95 AT | | | 120° F. | 375B | Polycron 111 | 0 | 100 | 9 | 8 | 7 | 7 |
| 15 | 300 | 40 | | 308B | Lilly UG | 0 | 120 | 7 | — | 6 | 5 |
| PG 800 HP | | | 90° F. | 308B | Lilly UG | 0 | 120 | 5 | — | 5 | 4 |
| 95 AT | | | 120° F. | 308B | Lilly UG | 0 | 120 | 6 | — | 5 | 5 |
| 15 | 300 | 40 | | 308B | Icron PG | 0 | 90 | 8 | — | 7 | 6 |
| PG 800 HP | | | 90° F. | 308B | Icron PG | 0 | 30 | 6 | — | 5 | 5 |
| 95 AT | | | 120° F. | 308B | Icron PG | 0 | 30 | 7 | — | 6 | 6 |
| 15 | 300 | 40 | | 308B | Polycron 111 | 0 | 80 | 9 | — | 7 | 6 |
| PG 800 HP | | | 90° F. | 308B | Polycron 111 | 0 | 100 | 8 | — | 6 | 5 |
| 95 AT | | | 120° F. | 308B | Polycron 111 | 0 | 80 | 8 | — | 7 | 6 |

Lilly UG = Lilly #028 Universal Grey
Icron PG = Icron Polyester Grey
PG 800 HP = PhosGard 800 HP
95 AT = Parcolene 95 AT While the present invention has been described with respect to particular embodiment thereof, it is apparent that numerous other forms and modifications of the invention will be obvious to those skilled in the art. The appended claims and this invention generally should be construed to cover all such obvious forms and modifications, which are within the true spirit and scope of the present invention.

What is claimed is:

1. A composition for the treatment of metal substrates, comprising an aqueous solution of a Group IVA metal ion, selected from the group consisting of zirconium, titanium, hafnium, and mixtures thereof, and a water-soluble or water-dispersible polyphenolamine having the general formula:

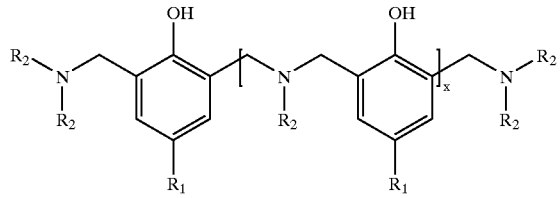

wherein $R_1$ is a substituted or unsubstituted $C_1$–$C_{18}$ alkyl or aryl, or mixtures thereof; x is 1–100; $R_2$ is a hydrogen, substituted or unsubstituted alkyl, aryl, hydroxyalkyl, —[—CH($R_3$)—CH$_2$—O—]$_n$—$R_3$, or mixtures thereof; $R_3$ is a hydrogen, $C_1$–$C_{18}$ alkyl radical, or mixtures thereof; and n is 1–100.

2. The composition of claim 1 wherein said polyphenolamine is neutralized with an acid selected from the group consisting of acetic, oxalic, hydrochloric, sulfuric, phosphoric, phosphorous, nitric, hexafluozirconic, hexafluotitanic, hexafluosilicic, and mixtures thereof.

3. The composition of claim 1 wherein said polyphenolamine is derived by the reaction of p-cresol, formaldehyde, and a mixture of ethanolamine and a polyetheramine to yield a compound of the following formula:

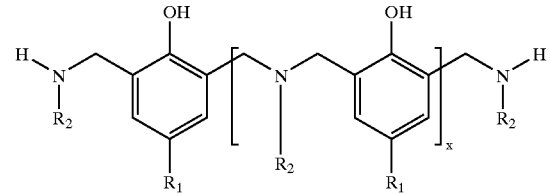

wherein x is 1 to 25, $R_2$ is a mixture of —CH$_2$—CH$_2$—OH and —[—CH($R_3$)—CH$_2$—O—]$_n$—CH$_3$; n is approximately 22; and $R_3$ is approximately a 19:3 molar ratio of hydrogen to $C_1$ alkyl.

4. The composition claim 3 wherein the mole ratio of ethanolamine to polyetheramine is from 50:50 to 99:1.

5. The composition of claim 4 wherein said composition is neutralized with phosphoric acid.

6. The composition of claim 1 wherein said polyphenolamine is made acidic by means of an acid selected from the group consisting of hexafluozirconic acid, hexafluotitanic acid, hexafluosilicic acid, phosphoric acid, sulfuric acid, hydrochloric acid, acetic acid, oxalic acid and mixtures thereof.

7. The composition of claim 1 wherein the pH of the solution is from about 2.0 to 10.5.

8. A method for inhibiting corrosion of a corrodible metal substrate, said method comprising:

contacting the metal substrate with a composition comprising an aqueous solution of a Group IVA metal ion, selected from the group consisting of zirconium, titanium, hafnium, and mixtures thereof, and a water-soluble or water-dispersible polyphenolamine having the general formula:

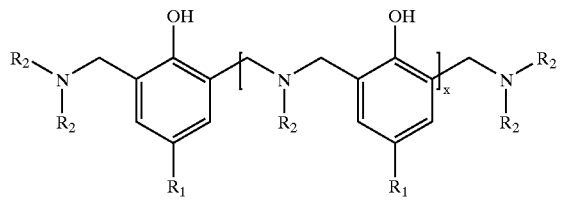

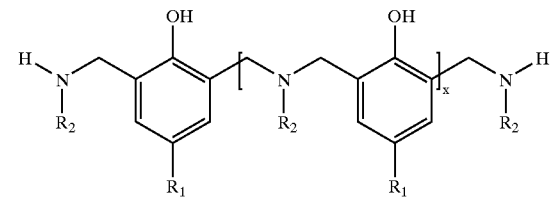

wherein $R_1$ is a substituted or unsubstituted $C_1$–$C_{18}$ alkyl or aryl, or mixtures thereof; x is 1–100; $R_2$ is a hydrogen, substituted or unsubstituted alkyl, aryl, hydroxyalkyl, —[—CH($R_3$)—CH$_2$—O—]$_n$—$R_3$, or mixtures thereof; $R_3$ is a hydrogen, $C_1$–$C_{18}$ alkyl radical, or mixtures thereof; and n is 1–100.

9. The method as recited in claim 8 wherein said polyphenolamine is neutralized with an acid selected from the group consisting of acetic, oxalic, hydrochloric, sulfuric, phosphoric, phosphorous, nitric, hexafluozirconic, hexafluotitanic, hexafluosilicic, and mixtures thereof.

10. The method as recited in claim 8 wherein said polyphenolamine is derived by the reaction of p-cresol, formaldehyde, and a mixture of ethanolamine and a polyetheramine to yield a compound of the following formula:

wherein x is 1 to 25, $R_2$ is a mixture of —CH$_2$—CH$_2$—OH and —[—CH($R_3$)—CH$_2$—O—]$_n$—CH$_3$; n is approximately 22; and $R_3$ is approximately a 19:3 molar ratio of hydrogen to $C_1$ alkyl.

11. The method as recited in claim 8 wherein the mole ratio of ethanolamine to polyetheramine is from 50:50 to 99:1.

12. The method as recited in claim 8 wherein said composition is neutralized with phosphoric acid.

13. The method as recited in claim 8 wherein said polyphenolamine is made acidic by means of acid selected from the group consisting of hexafluozirconic acid, hexafluotitanic acid, hexafluosilicic acid, phosphoric acid, sulfuric acid, hydrochloric acid, acetic acid, oxalic acid and mixtures thereof.

14. The method as recited in claim 8 wherein the pH of the solution is from about 2.0 to 10.5.

* * * * *